United States Patent
Takahira et al.

(10) Patent No.: US 6,183,048 B1
(45) Date of Patent: Feb. 6, 2001

(54) BRAKE CONTROL DEVICE OF AUTOMOBILE FOR SHARP BRAKING IN BACKWARD MOVEMENT

(75) Inventors: Yosuke Takahira, Toyota; Kazushi Hosomi, Susono, both of (JP)

(73) Assignee: Toyota Jidosha Kabushiki Kaisha, Toyota (JP)

( * ) Notice: Under 35 U.S.C. 154(b), the term of this patent shall be extended for 0 days.

(21) Appl. No.: 09/166,926

(22) Filed: Oct. 6, 1998

(30) Foreign Application Priority Data

Nov. 5, 1997 (JP) .................................................. 9-319047

(51) Int. Cl.$^7$ ........................................................ B60T 8/38
(52) U.S. Cl. .................................................... 303/113.1
(58) Field of Search ........................... 303/113.1, 113.2, 303/113.3, 113.5, 114.1, 114.2, 115.1, 115.2, 116.1, 116.2, 119.1, 186, 191, DIG. 4

(56) References Cited

U.S. PATENT DOCUMENTS 4,852,950 * 8/1989 Murakami ............................ 303/100
6,007,454 * 12/1999 Takahira ................................. 477/92

FOREIGN PATENT DOCUMENTS 7-165041   6/1995 (JP) .

* cited by examiner

*Primary Examiner*—Christopher P. Schwartz
*Assistant Examiner*—C. T. Bartz
(74) *Attorney, Agent, or Firm*—Oliff & Berridge, PLC

(57) ABSTRACT

In an automobile having a pair of front wheels and a pair of rear wheels, and a brake system for selectively braking each of the pairs of front and rear wheels, a brake control device comprises a device for detecting a backward movement of the automobile, a device for detecting a predetermined locking condition of at least one of the pair of front wheels, and a device for controlling braking force applied by the brake system to the pair of rear wheels to be stronger than braking force applied by the brake system to the pair of front wheels when the automobile is moving backward with at least one of the pair of front wheels being more locked than the predetermined locking condition.

3 Claims, 4 Drawing Sheets

BRAKE CONTROL DEVICE OF AUTOMOBILE FOR SHARP BRAKING IN BACKWARD MOVEMENT

BACKGROUND OF THE INVENTION

1. Field of the Invention

The present invention related to a brake system of automobile, and more particularly, to a brake control device for more effectively actuating the brake system of an automobile in braking a backward moving of the automobile.

2. Description of the Prior Art

In Japanese Patent Laid-open Publication 7-165041 it is proposed to control the distribution of the braking force between the front wheels and the rear wheels of an automobile, particularly a heavy track or the like in which a large mass of the vehicle body is centered at a relatively high position above the road surface, with the wheel base being relatively short, so that when the automobile is sharply braked in a forward running, the rear wheels lose much of the ground contact load, thereby correspondingly losing the tire grip for effecting the braking, while the rear wheels are substantially locked and slide over the road surface. According to the proposal, the supply of the brake fluid to the rear wheels is regulated by a regulator valve actuated in response to an imbalance of the suspension fluid pressures of the front and rear wheels which reflects thereon how the ground contact load of the wheels has shifted from the rear wheels to the front wheels, such that the supply of the brake fluid to the rear wheels is throttled by the regulator valve according to an increase in the imbalance of the suspension fluid pressures of the front and rear wheels. In this connection, it is also proposed not to actuate the regulator valve when the automobile is braked while climbing a relatively steep slope or when the automobile is braked when it is moving backward, so that normal full braking is available at the rear wheels.

In the above-mentioned prior art, the braking force available at the rear wheels is the normally available maximum braking force also available at the front wheels.

SUMMARY OF THE INVENTION

The present invention increases the braking force available at the rear wheels beyond the normally available maximum level in response to a depression of the brake pedal by a driver when the automobile is to be sharply braked in a backward movement, with the ground contact load being shifted from the front wheels to the rear wheels.

Therefore, it is a primary object of the present invention to provide a brake control device of an automobile having a brake system, the brake control device controlling the brake system to apply a larger braking force to the rear wheels than to the front wheels when desired according to a depression of a brake pedal by a driver.

According to the present invention, the above-mentioned primary object is accomplished by a brake control device of an automobile having a pair of front wheels and a pair of rear wheels, and a brake system for selectively braking each of the pairs of front and rear wheels, the brake control device comprising means for detecting a backward movement of the automobile, means for detecting a predetermined locking condition of at least one of the pair of front wheels, and means for controlling the brake system such that braking force applied by the brake system to the pair of rear wheels is stronger than braking force applied by the brake system to the pair of front wheels when the automobile is moving backward with at least one of the pair of front wheels locked more than the predetermined locking condition.

By the brake control device of the above-mentioned concept being incorporated into an automobile, the automobile can be braked more sharply and quickly in a backward movement than the conventional braking in a backward movement of the automobile, so that a bumping at a wall by the rear of the automobile or a lane off of a rear wheel or wheels is effectively avoided.

In the brake control device of the present invention, the brake system control means may control the brake system such that the braking force applied by the brake system to the pair of rear wheels is stronger than the braking force applied by the brake system to the pair of front wheels when the automobile is moving backward with at least one of the pair of front wheels being locked at a more locking condition than the predetermined locking condition, while the pair of rear wheels are braked at a larger braking force than a predetermined threshold braking force.

By such an arrangement, the application of the brake control device according to the present invention is focussed to an operating condition of the automobiles where desired.

A brake system such as selectively braking each of the pairs of front and rear wheels of an automobile is available when the automobile is equipped with a behavior control system such as shown in, for example, U.S. Pat. No. 5,702,165 about "Behavior Control System of Vehicle Distinctive of Oversteered and Understeered Conditions" or U.S. Ser. No. 08/723,757 about "Stability Control Device of Vehicle Operative Against Spin and Drift-out in Harmony", both having been assigned to the same assignee as the present application. The brake system for selectively braking each of the pairs of front and rear wheels of those behavior control is of course not operated when the automobile is moved backward generally at a very low speed. Therefore, such a brake system for a behavior control is fully available for the brake control for a backward movement of an automobile according to the present invention.

Therefore, it is a further object of the present invention to effectively realize the above-mentioned basic control concept by utilizing the brake system of a behavior control of an automobile.

In order to accomplish the above-mentioned further object of the present invention, the brake control device according to the present invention may be constructed such that the brake system comprises wheel cylinders each applying a braking force to each corresponding one of the pairs of front and rear wheels according to a supply of a pressurized brake fluid thereto, a brake pedal, a master cylinder for pressurizing the brake fluid to supply the pressurized brake fluid to the wheel cylinders of the pair of front wheels according to a depression of the brake pedal by a driver, a powered pressurized brake fluid source means, a hydro-booster for generating a pressurized flow of the brake fluid from the powered pressurized brake fluid source means according to the pressurization of the brake fluid by the master cylinder to supply the pressurized flow of the brake fluid to the wheel cylinders of the pair of rear wheels, a pair of inlet control valves each selectively opening through or interrupting an inlet passage of each of the wheel cylinders of the pair of rear wheels, a pair of outlet control valves each selectively interrupting or opening through an outlet passage of each of the wheel cylinders of the pair of rear wheels, and a pair of changeover valves for selectively exchanging a connection of each of the wheel cylinders of the pair of rear wheels with the hydro-booster and a connection thereof with the powered pressurized brake fluid source means via each corresponding one of the pair of inlet control valves with one another the brake system control means including means for controlling the pair of changeover valves, the pair of inlet control valves and the pair of outlet control valves such that the changeover valve connects each of the wheel cylinders of the pair of rear wheels with the powered pressurized brake fluid source means via each corresponding one of the pair of inlet control valves, while the pair of inlet control valves and the pair of outlet control valves are selectively opened or closed so as to apply larger braking forces to the pair of rear wheels than braking force applied to the pair of front wheels by a depression of the brake pedal by the driver, when the automobile is moving backward with at least one of the pair of front wheels being locked at a more locking condition than the predetermined locking condition, while the pair of rear wheels are braked at a larger braking force than a predetermined threshold braking force.

BRIEF DESCRIPTION OF THE DRAWINGS

In the accompanying drawings.

DESCRIPTION OF THE PREFERRED EMBODIMENT

The present invention will be described in more detail with respect to an embodiment thereof with reference to the accompanying drawings.

Figure 1:
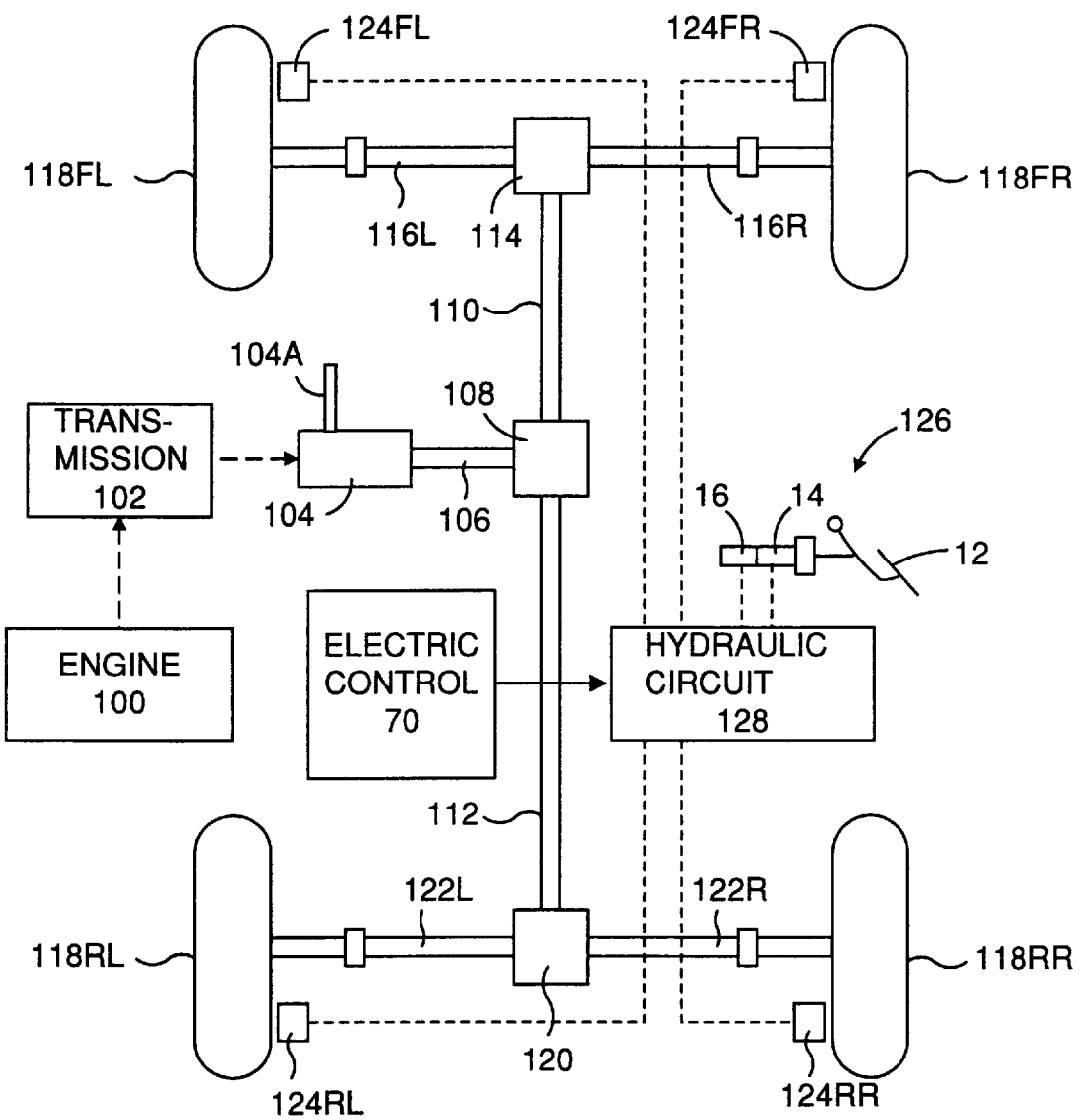
FIG. 1 is a diagrammatical illustration of an automobile in which the brake control device according to the present invention in incorporated.

Referring first to FIG. 1 showing an automobile in a diagrammatical illustration, the automobile has a pair of front wheels, i.e. front left wheel 118FL and front right wheel 118FR, a pair of rear wheels, i.e. rear left wheel 118RL and rear right wheel 118RR, an engine 100, a transmission 102, and a high-low changeover gear 104 adapted to be changed over by a manual lever 104A to provide a high gear ratio or a low gear ration in transmitting the output rotational power of the engine 100 thorough the transmission 102 to an input shaft 106 of a center differential gear 108. The rotational power inputted to the center differential gear 108 is divided into a front part transmitted through a shaft 110 to a front differential gear 114 which divides its input rotational power into a front left axle 116L for driving the front left wheel 118FL and a front right axle 116R for driving the front right wheel 118FR, and a rear part transmitted through a shaft 112 to a rear differential gear 120 which divides its input rotational power into a rear left axle 122L for driving the rear left wheel 118RL and a rear right axle 122R for driving the rear right wheel 118RR. The automobile is further equipped with a brake system including the conventional manual brake means 126 consisting of a brake pedal 12, a master cylinder 14 and a hydro-booster 16, a hydraulic circuit 128 shown in more detail in FIG. 2, wheel cylinders 124FL, 124FR, 124RL and 124RR provided for applying braking forces to the front left, front right, rear left and rear right wheels, respectively, according to a supply of a pressurized brake fluid from the hydraulic circuit 128, and an electric control means 70 for controlling the operation of the hydraulic circuit 128 via electromagnetic actuators (not shown) of the respective changeover valves included therein, as described in detail hereinbelow.

Figure 2A:
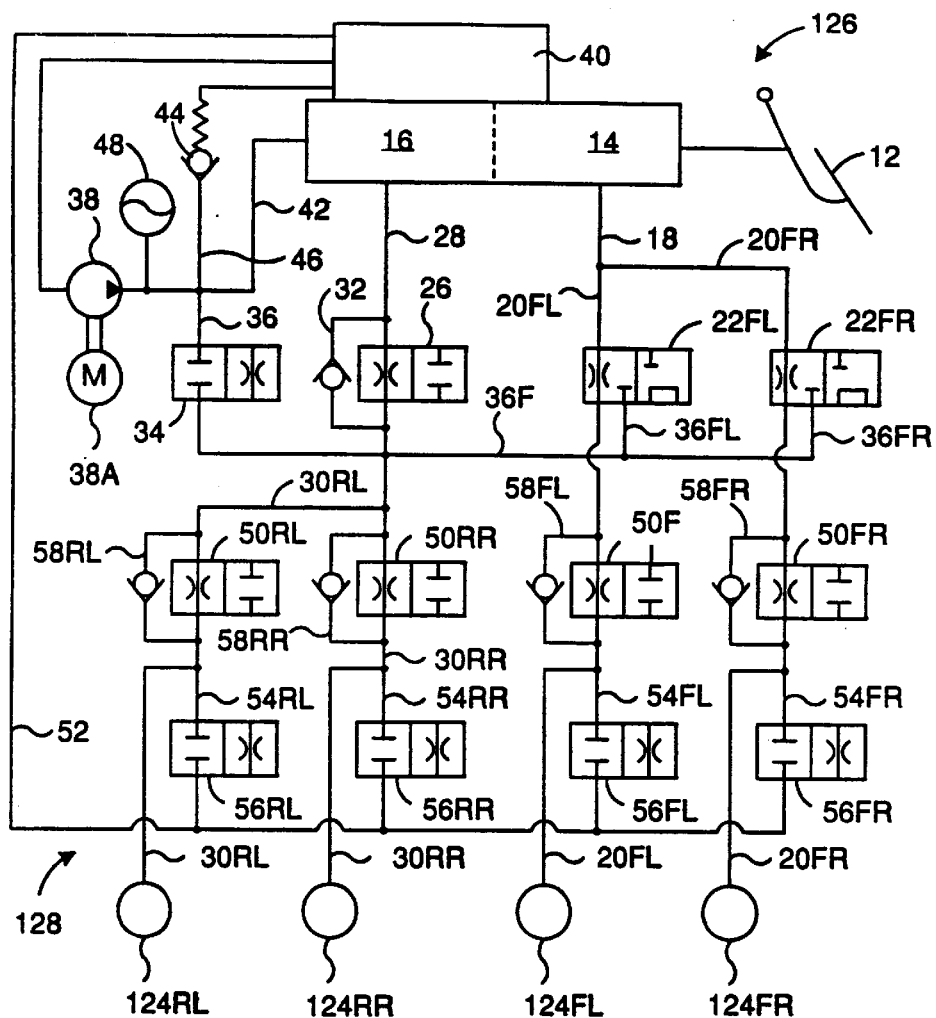
FIG. 2A is a diagrammatical illustration of a hydraulic circuit constructed to execute a behavior control system of an automobile in which the brake control device according to the present invention is incorporated.

In FIG. 2A, the manual brake means 126 including the brake pedal 12 to be depressed by a driver, the master cylinder 14 and the hydro-booster 16 are as the same as shown in FIG. 1. A brake fluid pressurized by the master cylinder 14 according to a depression of the brake pedal 12 is conducted through a passage 18 and branched passages 20FL and 20FR to wheel cylinders 24FL and 24FR of front left and front right wheels, respectively. The passage 20FL incorporates changeover valves 22FL and 50FL in series. The changeover valve 22FL normally opens the passage 20FL through and selectively interrupts the downstream side of the passage 20FL from its upstream side connected with the master cylinder 14, while connecting the downstream side of the passage 20FL to a passage 36FL branched from a passage 36F adapted to be supplied with an accumulator pressure as described hereinbelow. The changeover valve 50FL normally opens the passage 20FL through and selectively interrupts the passage 20FL. The changeover valve 50FL is bypassed by a bypass passage 58FL including a one way valve oriented to allow the fluid to flow only from the downstream side to the upstream side thereof. Similarly, the passage 20FR incorporates changeover valves 22FR and 50FR in series. The changeover valve 22FR normally opens the passage 20FR through and selectively interrupts the downstream side of the passage 20FR from its upstream side connected with the master cylinder 14, while connecting the downstream side of the passage 20FR with a passage 36FR branched from the passage 36F. The changeover valve 50FR normally opens the passage 20FR through and selectively interrupts the passage 20FR. The changeover valve 50FR is bypassed by a bypass passage 58FR including a one way valve oriented to allow the fluid to flow only from the downstream side of the upstream side thereof.

The wheel cylinder 124FL is connected with a return passage 52 via an exhaust passage 54FL incorporating a changeover valve 56FL which normally interrupts the exhaust passage 54FL and selectively opens the exhaust passage 54FL through. Similarly, the wheel cylinder 124FR is connected with the return passage 52 via an exhaust passage 54FR incorporating a changeover valve 56FR which normally interrupts the exhaust passage 54FR and selectively opens the exhaust passage 54FR through.

The pressurized brake fluid generated by the hydro-booster 16 is conducted through a passage 28 incorporating a changeover valve 26 to be branched to two passages 30RL and 30RR leading to wheel cylinders 124RL and 124RR, respectively. The changeover valve 26 normally opens the passage 28 through and selectively interrupts the passage 28. The changeover valve 26 is bypassed by a bypass passage 32 including a one way valve oriented to allow the fluid to flow only from the upstream side to the downstream side thereof. The passage 30RL incorporates a changeover valve 50RL which normally opens the passage 30RL through and selectively interrupts the passage 30RL. The changeover valve 50RL is bypassed by a bypass passage 58RL including a one way valve oriented to allow the fluid to flow only from the downstream side to the upstream side thereof. Similarly, the passage 30RR incorporates a changeover valve 50RR which normally opens the passage 30RR through and selectively interrupts the passage 30RR. The changeover valve 50RR is bypassed by a bypass passage 58RR including a one way valve oriented to allow the fluid to flow only from the downstream side to the upstream side thereof.

The wheel cylinder 124RL is connected with the return passage 52 via an exhaust passage 54RL incorporating a changeover valve 56RL which normally interrupts the exhaust passage 54RL and selectively opens the exhaust passage 54RL through. Similarly, the wheel cylinder 124RR is connected with the return passage 52 via an exhaust passage 54RR incorporating a changeover valve 56RR which normally interrupts the exhaust passage 54RR and selectively opens the exhaust passage 54RR through.

A pump 38 is provided to be driven by an electric motor 38A for selectively pumping the brake fluid from a reservoir 40 to a supply passage 36 connected with the passage 36F via a changeover valve 34 which normally interrupts the communication between the passages 36 and 36F and selectively communicates the passage 36 with the passage 36F. The output of the pump 38 is branched by a passage 42 to be supplied to the hydro-booster 16. The outlet passage 36 is also connected to the reservoir 40 by a release passage 46 including a pressure relief valve 44. The hydro-booster 16 generates the flow of pressurized brake fluid supplied through the passage 28 from the pressurized brake fluid supplied through the passage 42 to be substantially of the same pressure level as the master cylinder pressure supplied through the passage 18.

Figure 2B:
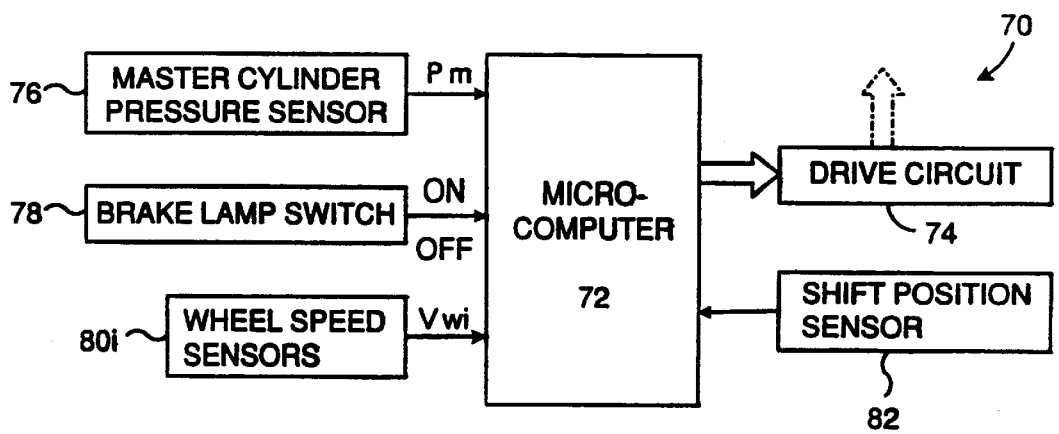
FIG. 2B is a diagrammatical illustration of an electric control part of the behavior control system in which the control part of the brake control device according the present invention is incorporated.

The changeover valves 22FL, etc. are all changed over between the two changeover positions by the respective electromagnetic actuators not shown in the figure under a control of the control system shown in FIG. 2B. The control system of FIG. 2B comprises a microcomputer 72 originally constructed to execute various behavior control calculations for desired behavior control operations of the hydraulic circuit shown in FIG. 2A. However, the microcomputer 72 is of course constructed to also execute the brake control calculations according to the present invention. The microcomputer 72 may be of a standard type including a central processing unit, a random access memory, a read only memory, input and output port means and a common bus interconnecting those components, and is supplied with input information about various parameters required for the original behavior control, and particularly such information required for the brake control according to the present invention, as a master cylinder pressure Pm detected by a master cylinder pressure sensor 76, an on/off signal from a brake lamp switch 78, wheels speeds Vwi(i=fl, fr, rl and rr) of the front left, front right, rear left and rear right wheels from wheel speed sensors 80$i$ (i=fl, fr, rl and rr), and shift position of the transmission, particularly if the transmission is shifted to the reverse position, from a shift position sensor 82.

The microcomputer 72 carries out the original behavior control calculations as well as the brake control calculations according to the present invention based upon the values of the read in parameters and the programs stored in the read only memory, and dispatches instruction signals to a drive circuit 74 which operates the changeover valves 22FL, etc. by energizing or deenergizing the electromagnetic actuators of the respective changeover valves.

As well known in the art of automobile behavior control, when the automobile running along a leftward curved road is to be suppressed from spinning, the changeover valve 34 is changed over from the position shown in the figure to the position opposite thereto for communicating the passage 36 to passage 36F, while simultaneously changing over the changeover valve 22FR so that the downstream of the passage 20FR is disconnected from the passage 18 and connected to the passage 36FR, so that the fluid pressure stored in the accumulator 48 is available for operating the wheel cylinder 124FR of the front right wheel, and then the changeover valves 50FR and 56FR are selectively changed over to supply a desired amount of the pressurized fluid to the wheel cylinder 124FR, thereby selectively braking the front right wheel, so that an anti-spin moment is generated in the automobile.

On the other hand, when the automobile running along a leftward curved road is to be suppressed from drifting out, the changeover valves 34, 26, 50RL, 56RL, 50RR and 56RR are selectively changed over so that the wheel cylinder 124RL or the wheel cylinders 124RL and 124RR are supplied with a controlled fluid pressure, thereby selectively braking the rear left wheel or the rear left and rear right wheels, so that the automobile is suppressed from drifting out by the deceleration thereof, or further, a yaw moment is generated in the automobile around the braked rear left wheel so as to help the automobile to turn toward left.

Such behavior controls are not executed when the automobile is driven or moved by the gravity backward on a downhill at a low speed. Therefore, the powered pressurized brake fluid source by the pump 38 and the accumulator 48 is ready for use with the brake control according to the present invention. Further, in this connection, and in view of a general construction of the brake system, or even such a brake system constructed for a behavior control as the brake system shown in FIG. 2A, it will be noted that the braking to a pair of front or rear wheels during such a slow backward movement of the automobile is or may be applied equally at a same strength for both of a pair of left and right wheels. Therefore, in the descriptions of the specification and the claims of the present application, it is generally assumed that, when a braking force applied to a pair of front or rear wheels according to the present invention is referred to, the braking force means the total of the braking force applied equally to both of a pair of front or rear wheels.

An embodiment of the brake control device according to the present invention incorporated into the hydraulic circuit shown in FIG. 2A and the electric control means shown in FIG. 2B will be described in the form of its operations with reference to the flowchart of FIG. 3.

Figure 3:
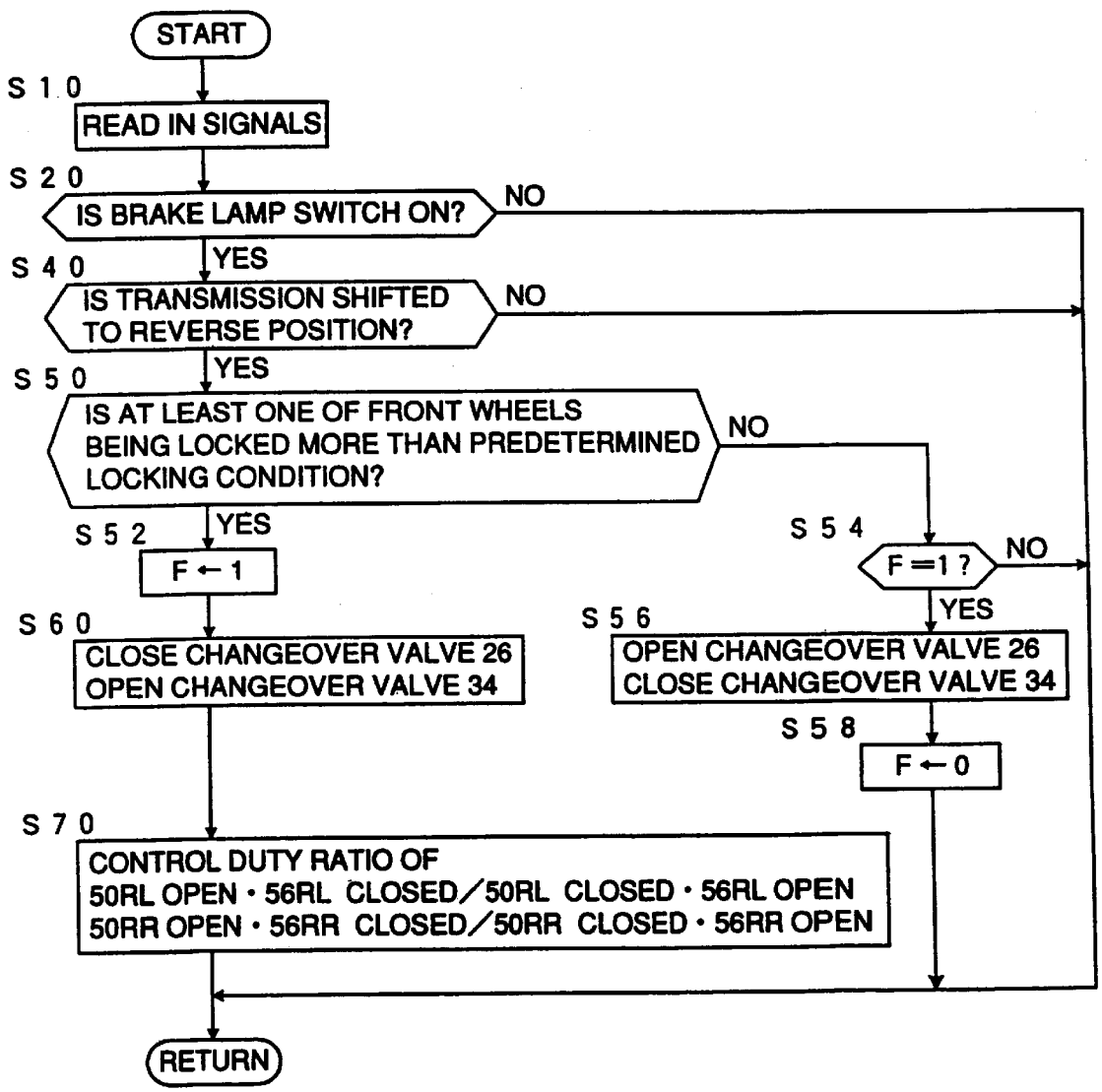
FIG. 3 is a flowchart showing an embodiment of the brake control device according to the present invention in the form of its control operations.

The control operations according to the flowchart of FIG. 3 are started by a turning on of an ignition switch not shown in the figure of the automobile and are cyclically repeated until the ignition switch is turned off, as is common in this kind of art.

When the control operation is started, in step 10 signals such as those shown in FIG. 2B are read in.

In step 20, it is judged if the brake lamp switch is on. If the answer is no, the operation of the brake control device of the present invention is not needed. Therefore, the control is returned to re-circulate the flowchart. When the answer of step 20 is yes, the control proceeds to step 40, and it is judged if the transmission is shifted to the reverse position. When the answer is no, the operation of the brake control device of the present invention is not needed either. Therefore, the control is returned for re-circulation. When the answer of step 40 is yes, the control proceeds to step 50.

In step 50, it is judged if at least one of the front wheels is being locked more than such a predetermined locking condition that will indicate a substantial slipping of at least one of the front wheels due to a loss of the tire grip. The locking condition of the front wheels will be detected by a comparison of the wheels speed of each of the front wheels with a mean value of the wheel speeds of the rear wheels. When the answer is yes, the control proceeds to step 52, wherein a flag F is set to 1, and the control proceeds to step 60. When the answer is no, the control proceeds to step 54, wherein it is judged if the flag F is 1. When the answer is yes, the control proceeds to step 56, while when the answer is no, the control returns. When the answer of step 50 is yes, the control proceeds to step 60.

In step 60, in the hydraulic circuit of FIG. 2A, the changeover valve 26 is closed, while the changeover valve 34 is opened to place the wheel cylinders 124RL and 124RR of the rear wheels under the application of the pressurized brake fluid from the powered pressurized brake fluid source consisting of the pump 38 and the accumulator 48. Then, the control proceeds to step 70. In step 56, the changeover valves 26 and 34 closed and opened in step 60 are opened and closed, respectively. Then, in step 58, the flag F is reset to 0.

In step 70, the changeover valves 50RL, 50RR, 56RL and 56RR are operated through the drive circuit 74 under the control of the microcomputer 72 so that the brake fluid pressure supplied to each of the wheel cylinders 124RL and 124RR is controlled according to the duty ratio of a time duration during which the inlet changeover valve 50RL or 50RR is opened with the outlet changeover valve 56RL or 56RR being closed for increasing the pressure of the wheels cylinder 124RL or 124RR and a time duration during which the inlet changeover valve 50RL or 50RR is closed with the outlet changeover valve 56RL or 56RR being opened for decreasing the pressure of the wheels cylinder 124RL or 124RR. Such a duty ratio control of the inlet and outlet changeover valves for the pressure control of the wheel cylinders is already well known in the art of behavior control of automobiles. In this connection, it is desirable that the increase of the pressure of the wheel cylinder 124RL or 124RR under the powered pressurized brake fluid source is executed by watching the locking condition of the rear wheels, so that no such excessive braking of the rear wheels is executed as to cause a substantial saturation of the tire grip of the rear wheels.

After step 70, the control returns to step 10, so as to cyclically execute the control through steps 10–70 at a cycle time such as tens of microseconds.

Figure 4:
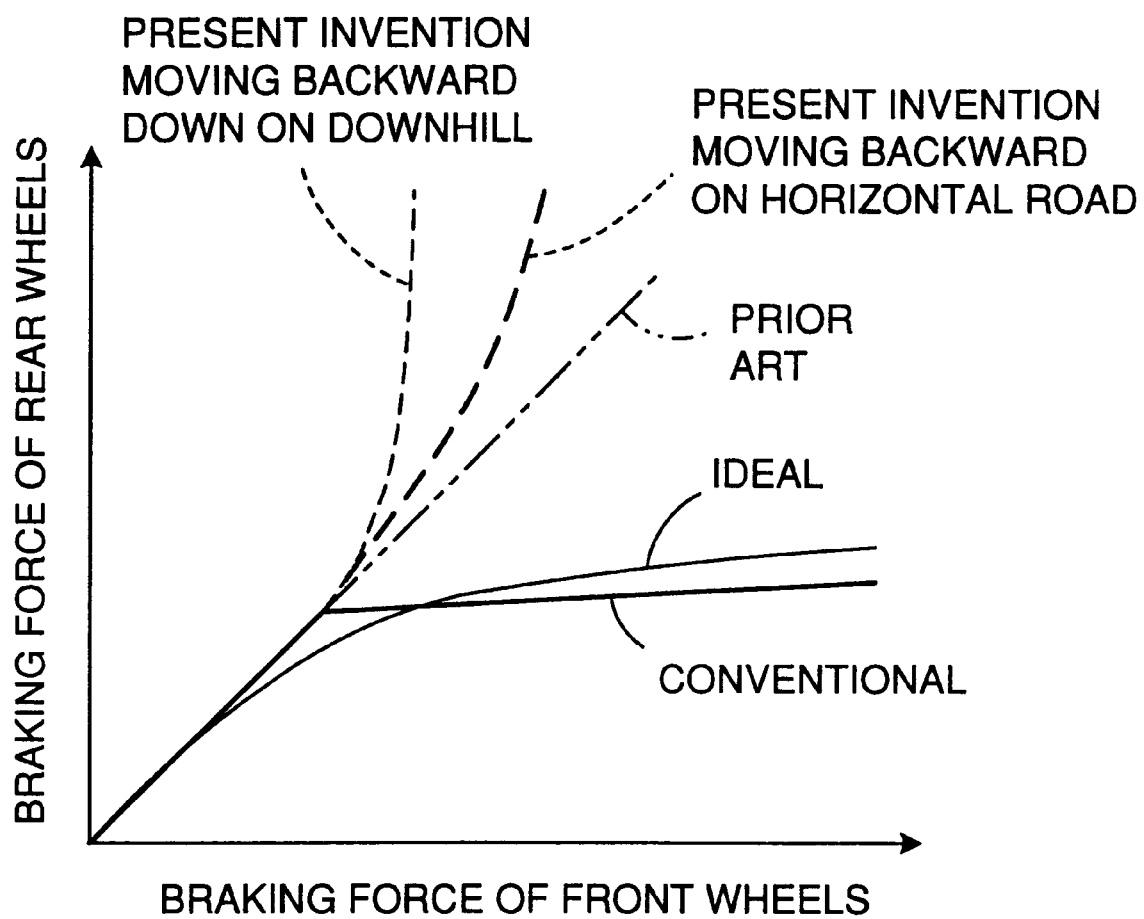
FIG. 4 is a graph showing the relationship between the braking force of the front wheels and the braking force of the rear wheels according to the conventional practice, the above-mentioned prior art, and the present invention.

FIG. 4 is a graph showing the performance of the present invention in comparison with an ideal performance, a conventional performance and the performance available by the afore-mentioned Japanese Patent Laid-open Publication 7-165041, with respect to the relationship between the braking force of the front wheels and the braking force of the rear wheels.

As shown in FIG. 4, it is generally considered to be ideal that the braking force of the rear wheels is gradually decreased relative to the braking force of the front wheels according to increase of the braking force of the front wheels (also of the rear wheels), so as to follow a saturation curve such as denoted "ideal" in the figure. In view of this, the practical brake systems are generally so constructed as to let the braking force of the rear wheels saturate when the braking force of the front wheels is increased beyond a certain threshold value, to obtain a performance curve denoted "conventional" in the figure. The above-mentioned Japanese Patent Laid-open Publication 7-165041 proposes to modify the conventional saturation performance to a straight performance such as shown by a straight line denoted "prior art" in the figure, when an automobile is sharply braked in moving backward.

In contrast to those ideal, conventional and prior art performances, the present invention can provide such performances as shown by thick and thin broken lines in the figure. The thick broken line shows a performance to be effected when an automobile is moving backward on a horizontal road, while the thin broken line shows a performance to be effected when an automobile is moving backward down on a downhill. In the former case, the braking force of the rear wheels is gradually increased to be larger than the braking force of the front wheels at a relatively moderate rate when the braking force of the rear wheels (also of the front wheels) is increased beyond a threshold value. In the latter case, the braking force of the rear wheels is increased to be larger than the braking force of the front wheels at a relatively high rate when the braking force of the rear wheels (also of the front wheels) is increased beyond the threshold value.

From the comparison of these performance curves, it will be appreciated that a high braking performance is obtained in a backward moving of the automobile equipped with the brake control device of the present invention, and further that such a high braking performance is available in a manner adjustable according to the sloping condition of the road. Further, it will be apparent that such an adjustment for the sloping condition of the road is similarly applicable to other conditions such as the wetting condition of the road according to the weather, or the difference of the frictional coefficient of the road according to the difference in the finishing construction of the road surface.

Although the present invention has been described in detail with respect to a preferred embodiment thereof, it will be apparent for those skilled in the art that other various modifications are possible without departing from the scope of the present invention.

What is claimed is:

1. A brake control device of an automobile having a pair of front wheels and a pair of rear wheels, and a brake system for selectively braking each of the pairs of front and rear wheels, the brake control device comprising means for detecting a backward movement of the automobile, means for detecting a predetermined locking condition of at least one of the pair of front wheels, and means for controlling the brake system such that braking force applied by the brake system to the pair of rear wheels is stronger than braking force applied by the brake system to the pair of front wheels when the automobile is moving backward with at least one of the pair of front wheels being more locked than a predetermined locking condition.

2. A brake control device according to claim 1, wherein the brake system control means controls the brake system such that the braking force applied by the brake system to the pair of rear wheels is stronger than the braking force applied by the brake system to the pair of front wheels when the automobile is moving backward with at least one of the pair of front wheels being more locked than the predetermined locking condition, while the pair of rear wheels are braked at a larger braking force than a predetermined threshold braking force.

3. A brake control device according to claim 1, wherein the brake system comprises wheel cylinders each applying a braking force to each corresponding one of the pairs of front and rear wheels according to a supply of a pressurized brake fluid thereto, a brake pedal, a master cylinder for pressurizing the brake fluid to supply the pressurized brake fluid to the wheel cylinders of the pair of front wheels according to a depression of the brake pedal by a driver, a powered pressurized brake fluid source means, a hydro-booster for generating a pressurized flow of the brake fluid from the powered pressurized brake fluid source means according to the pressurization of the brake fluid by the master cylinder to supply the pressurized flow of the brake fluid to the wheel cylinders of the pair of rear wheels, a pair of inlet changeover valves each selectively opening through or interrupting an inlet passage of each of the wheel cylinders of the pair of rear wheels, a pair of outlet changeover valves each selectively interrupting or opening through an outlet passage of each of the wheel cylinders of the pair of rear wheels, and a pair of changeover valves for selectively exchanging a connection of each of the wheel cylinders of the pair of rear wheels with the hydro-booster and a connection thereof with the powered pressurized brake fluid source means via each corresponding one of the pair of inlet changeover valves with one another, the brake system control means including means for controlling the pair of changeover valves, the pair of inlet changeover valves and the pair of outlet changeover valves such that the changeover valves connect each of the wheel cylinders of the pair of rear wheels with the powered pressurized brake fluid source means via each corresponding one of the pair of inlet changeover valves, while the pair of inlet changeover valves and the pair of outlet changeover valves are selectively opened or closed so as to apply larger braking forces to the pair of rear wheels than braking force applied to the pair of front wheels by a depression of the brake pedal by the driver, when the automobile is moving backward with at least one of the pair of front wheels being more locked than the predetermined locking condition, while the pair of rear wheels are braked at a larger braking force than a predetermined threshold braking force.

* * * * *